United States Patent [19]

Flannery et al.

[11] 3,912,524

[45] Oct. 14, 1975

[54] SPONTANEOUS OPAL GLASSES

[75] Inventors: James E. Flannery; Dale R. Wexell, both of Corning, N.Y.

[73] Assignee: Corning Glass Works, Corning, N.Y.

[22] Filed: Feb. 4, 1974

[21] Appl. No.: 439,078

[52] U.S. Cl. .................... 106/52; 106/39.7
[51] Int. Cl.[2] .... C03C 1/04; C03C 3/04; C03C 3/10
[58] Field of Search ............................ 106/52, 39.7

[56] References Cited
UNITED STATES PATENTS

| | | | |
|---|---|---|---|
| 2,224,469 | 12/1940 | Blau | 106/52 |
| 3,607,320 | 9/1971 | Sakka | 106/52 X |
| 3,667,973 | 6/1972 | Flannery | 106/54 |
| 3,681,098 | 8/1972 | Dumbaugh, Jr. et al. | 106/52 |
| 3,728,139 | 4/1973 | Carrier et al. | 106/54 |
| 3,805,107 | 4/1974 | Boyd | 106/52 X |
| 3,808,154 | 4/1974 | Omori | 106/52 X |
| 3,837,866 | 9/1974 | Dumbaugh, Jr. | 252/518 X |
| 3,839,053 | 10/1974 | Rittler | 106/52 X |

*Primary Examiner*—Allen B. Curtis
*Assistant Examiner*—Thomas A. Waltz
*Attorney, Agent, or Firm*—Clinton S. Janes, Jr.; Clarence R. Patty, Jr.

[57] ABSTRACT

This invention relates to the production of spontaneous opal glasses which are essentially free from boron and fluorine, that demonstrate uniformly dense opacity, and wherein the predominant opacifying phase is a crystal selected from the group consisting of sodium molybdate, sodium tungstate, barium molybdate, barium tungstate, and mixtures thereof. The glasses consist essentially, by weight on the oxide basis, of about 0.5–5% $Li_2O$, 2–12% $Al_2O_3$, 5–16% $R_2O$, wherein $R_2O$ consists of $Na_2O$ and/or $K_2O$ and wherein at least 5% $Na_2O$ is present in the absence of BaO, 65–80% $SiO_2$, 1.2–4% $RO_3$ wherein $RO_3$ consists of 1.2–4% $MoO_3$ or 1.6–4% $WO_3$ or mixtures thereof at least equivalent to 1.2% $MoO_3$, and, preferably, up to 10% BaO.

10 Claims, No Drawings

SPONTANEOUS OPAL GLASSES

BACKGROUND OF THE INVENTION

The invention relates to a system of spontaneous opal glasses; that is, glasses which achieve a high degree of opacity, "strike in," as they cool from the melt.

The term "opal glass", as used herein, generally denotes a glass containing a separated phase dispersed in the glassy matrix, which phase has an index of refraction differing from that of the transparent glass so as to render it essentially light diffusing or opaque. This separated phase may be either crystalline or amorphous. The degree of opacity may vary from a faint translucency to a dense opacity such as found in alabaster. Among the opacifying agents commonly used heretofore are fluorides, sulphates, chlorides, and phosphates.

Opal glasses may be categorized as spontaneous opals or reheat opals, depending on the rate of opal development. A reheat opal is one which develops slowly, and which is clear, or only faintly opacified, when formed and cooled in the usual manner. Such glass must be reheated to separate the opal phase in the glass. In contrast, a spontaneous opal glass is one in which the light-diffusing phase readily develops upon cooling and forming the melt into a glass article so that further reheating to obtain the desired degree of opacity is not required. It will be appreciated that the elimination of any reheat treatment reduces the production cost of the finished articles, and therefore spontaneous opal glasses are normally preferred in commercial practice.

It is well recognized in the glass industry that serious volatilization problems may be expected when either boron or fluorine is included in a glass composition. Furthermore, as noted by H. H. Blau in U.S. Pat. No. 2,224,469 granted Dec. 10, 1940, the situation is aggravated by the joint presence of these two elements. Accordingly, the patentee proposed alkali metal fluoride opal glasses which included alumina in their compositions, which excluded boron and second group metal oxides, and which were melted from anhydrous batch materials. In spite of these precautions, the patent discloses that a glass calculated from the batch to contain 6.9% fluorine (F), actually showed only 3.7% when chemically analyzed.

U.S. Pat. No. 2,921,860, granted Jan. 19, 1960 in the name of S. D. Stookey, discloses spontaneous opal glasses that contain lithia and alumina in their compositions and an alkali metal fluoride as the opacifying crystal phase. A content of at least 5% fluorine is required and the patent discloses that a glass, calculated from the batch to contain 6.9% F, actually showed 5.2% by analysis when melted in a large commercial tank.

While this loss of fluorine has been recognized as a problem over the years, the practice has been to live with the problem and make appropriate compensations in batch formulations. However, recent strong emphasis on air pollution control has drawn increased attention to the contribution of fluorine in this respect. Accordingly, a strong desire has developed for a spontaneous opal that does not rely on a fluoride as an opacifying phase and that can be free of both boron and fluorine. It is a primary purpose of the present invention to meet this desire.

Several recently issued U.S. patents, for example, U.S. Pat. No. 3,681,098 granted Aug. 1, 1972 to Dumbaugh et al. and U.S. Pat. No. 3,728,139 granted Apr. 17, 1973 to Carrier et al., disclose that the oxides of molybdenum, tungsten, and arsenic create a unique effect in phase-separated, borosilicate type opal glasses. This effect is a modification of the geometrical nature of the opacifying droplets, and is believed to result from a change in interfacial tensions between the two glass phases in such phase separated glasses. The result is a denser opal glass, but the chemical nature of the opal phase does not appear to have undergone any appreciable change.

RELATED APPLICATION

A companion application, Ser. No. 439,077, filed concurrently herewith by use and entitled "Thermally Opacifiable Glasses", discloses similar base glasses but which contain fluorine in an amount less than 3% by weight and require further thermal treatment to develop the opal phase in the glass.

SUMMARY OF THE INVENTION

The present invention is based on our discovery that a molybdate or tungstate of sodium or barium crystal phase can separate from certain glasses to produce a novel spontaneous opal having a high degree of opacity. The invention is a spontaneous opal glass consisting essentially, in percent by weight on the oxide basis, of 65–80% $SiO_2$, 2–12% $Al_2O_3$, 0.5–5% $Li_2O$, 5–16% $R_2O$, wherein $R_2O$ consists of $Na_2O$ and/or $K_2O$ and wherein at least 5% $Na_2O$ is present in the absence of BaO, 1.2–4% $RO_3$, wherein $RO_3$ consists of 1.2–4% $MoO_3$ or 1.6–4% $WO_3$ or mixtures thereof at least equivalent to 1.2% $MoO_3$, and, preferably, up to 10% BaO, and having as the predominant opacifying phase a crystal selected from the group consisting of sodium molybdate, sodium tungstate, barium molybdate, barium tungstate, and mixtures thereof.

A particular feature of the invention is the production of a spontaneous opal having a dense uniform opacity while avoiding the presence of either fluorine or boron in the glass. Omission of these elements, or their compounds, minimizes air pollution from opal glass production. It also increases mold life in the glass article forming process since fluorine accumulation on, and corrosion of, molds is a principal cause of mold repair and replacement.

A further feature is the formation of a novel opacifying crystal phase, namely a molybdate or tungstate of sodium or barium. To this end, the glass must contain at least 1.2% $MoO_3$ or 1.6% $WO_3$ when either is present alone. Each is effective in amounts up to about 4% by weight. Mixtures of the two ingredients are also operable in amounts up to 4% total, but where less than 1.2% $MoO_3$ is present, the total $MoO_3 + WO_3$ must be equivalent to at least 1.2% $MoO_3$. Since $MoO_3$, by weight, is about 25% more effective than $WO_3$ in producing crystals, a lesser amount thereof is required to cause the development of crystals. Where less than 1.2% $MoO_3$ is present, an amount of $WO_3$ must be included to yield a mixture of the two components equivalent to the presence of at least 1.2% $MoO_3$. For example, where $MoO_3$ is utilized in an amount of 1.0%, at least about 0.25% $WO_3$ is required to insure crystal growth. In general, the cost of these oxides dictates that the minimum content necessary for a desired degree of opacity be used. Also, amounts greater than about 4% are difficult to dissolve in the glass melt.

The alkali metal oxides, $Na_2O$ and $K_2O$, perform their usual fluxing action in glass melting and provide control of glass working properties and coefficient of thermal expansion. Where the glasses are to be thermally strengthened (tempered), the coefficient of expansion should be at leat $45 \times 10^{-7}/°C$. To these ends, the total $Na_2O + K_2O$ content should be at least 5% by weight. With increasing alkali metal oxide content, expansion may increase unduly, the glasses lose chemical durability, and may become too soft for satifactory firing of decorative enamels. Accordingly, the total content of $Na_2O + K_2O$ should not exceed 16%.

Useful glasses may be produced with either $Na_2O$ or $K_2O$ alone, but, normally, $K_2O$ does not provide effective opacification. Therefore, either $Na_2O$ or $BaO$ must be present in an amount effective to produce an opacifying tungstate and/or molybdate crystal phase in the glass. For a desirable degree of opacity then, it is customary to employ at least 1% $BaO$ or 5% $Na_2O$.

Glasses containing both $Na_2O$ and $K_2O$ usually tend to exhibit better chemical durability than corresponding glasses containing either oxide alone. Also, it is customary to adjust physical properties, in particular thermal expansion and the temperature-viscosity relationship, by utilizing mixtures of these oxides in varying proportions. For example, the substitution of $K_2O$ for $Na_2O$ generally increases expansion and hardens the glass, that is raises the standard temperature-viscosity indicia (softening, strain and annealing points). Normally, an amount of $Na_2O$ greater than that of $K_2O$ is employed because of ready availability and easier melting. For tempered ware, we prefer 4–10% $Na_2O$ and 1–5% $K_2O$ with the total content of both ranging between about 5–13%.

The presence of $BaO$ in the glass composition frequently results in denser opacification due to the growth of barium molybdate and/or tungstate crystals. Hence, the preferred practice contemplates the inclusion of this ingredient in an amount effective to cause the development of such crystals. It has been observed that, when both $Na_2O$ and $BaO$ are present, there is a tendency for barium molybdate or tungstate to separate as the major, or even sole, opacifying phase as a result of its more limited solubility. Glass expansion tends to increase rapidly with increasing $BaO$ content so the amount present must not exceed about 10%, and is preferably not over about 5%. Other divalent metal oxides such as $MgO$, $CaO$, $SrO$, $CdO$, and $ZnO$ may be present in minor amounts to modify physical properties, but normally do not contribute to opacity.

Lithia ($Li_2O$) appears to act as a nucleating agent to facilitate opal crystal formation, thus rendering the crystal formation spontaneous. At least 0.5% is required for this purpose, and we commonly utilize a $Li_2O$ content of at least 1%. However, more than about 5% tends to soften the glass unduly, and we generally prefer not over 3%.

The presence of alumina is required for spontaneous opal development as well as chemical durability. With less than about 2% $Al_2O_3$, a spontaneous dense opal does not develop and chemical durability tends to be poor. Amounts greater than about 12% tend to make melting and forming difficult, however, so we prefer to limit $Al_2O_3$ to not over 10%.

In addition minor amounts of other compatible constituents may be included for such recognized secondary purposes as melting aids, coloring purposes, fining agents and for improvement of surface durability.

Glasses within the present invention may generally be melted and formed according to conventional and well-known glass melting and working techniques. Thus, they may be melted in either gas fired or electrically heated melting units at maximum temperatures in the range of about 1400°–1550°C. The particular melting schedule for any given glass may be determined from the glass properties and the nature of the melting unit in known manner.

Batch ingredients of a conventional nature are chosen. For example, a typical batch may contain sand, calcined alumina, lithium carbonate or lepidolite, molybdic and/or tungstic oxide, nitre, potash, barium carbonate, and arsenic oxide as a fining agent. Other known and equivalent raw materials may be substituted as desired.

The glasses may be molded or worked in any conventional manner. Hence, they may be rolled, drawn, pressed, or blown depending on the nature of the product desired. The opal phase separates "strikes in," as the glass is cooled during molding, and consistently forms a dense, uniform white opal, except as colorants are included to produce colored products such as tableware.

DESCRIPTION OF SPECIFIC EMBODIMENTS

The invention is further described with reference to exemplary glass compositions set forth in Table I in percent by weight on an oxide basis as calculated from the batch. In addition, glass physical properties, including strain point (St.P.), annealing point (A.P.), and softening point (S.P.), all measured in °C., as well as average thermal expansion coefficient $\times 10^{-7}$ between 0°C. and 300°C. (Exp.) and density (D) in grams/cc., are shown. Also, the major crystal phase observed in X-ray diffraction analyses is reported.

TABLE 1

|  | 1 | 2 | 3 | 4 | 5 |
|---|---|---|---|---|---|
| $SiO_2$ | 73.3 | 80.0 | 78.7 | 74.6 | 73.7 |
| $Al_2O_3$ | 8.6 | 4.5 | 8.6 | 8.6 | 8.6 |
| $Na_2O$ | 7.3 | 7.3 | 4.0 | 7.3 | 7.3 |
| $K_2O$ | 1.9 | 1.6 | 1.0 | 1.6 | 1.6 |
| $Li_2O$ | 3.0 | 1.0 | 2.0 | 1.0 | 1.0 |
| $BaO$ | 3.9 | 3.9 | 3.9 | 3.9 | 6.0 |
| $MoO_3$ | 2.0 | 1.8 | 1.8 | 3.0 | 1.8 |
| $WO_3$ | — | — | — | — | — |
| S.P. | 719 | 783 | 851 | 838 | 791 |
| A.P. | 494 | 519 | 564 | 544 | 537 |
| St.P. | 452 | 472 | 513 | 495 | 491 |
| Exp. | 74.8 | 62.3 | 52.0 | 63.5 | 66.0 |
| D | 2.43 | 2.39 | 2.37 | 2.41 | 2.45 |
| Major Crystal Phase | $BaMoO_4$ | $BaMoO_4$ | $BaMoO_4$ | $BaMoO_4$ | $BaMoO_4$ |
|  | 6 | 7 | 8 | 9 | 10 |
| $SiO_2$ | 72.2 | 71.7 | 70.0 | 66.0 | 75.7 |
| $Al_2O_3$ | 8.6 | 8.6 | 12.0 | 9.0 | 8.6 |
| $Na_2O$ | 7.3 | 7.3 | 7.3 | 12.5 | 7.3 |
| $K_2O$ | 1.6 | 1.6 | 1.9 | 3.0 | 1.9 |
| $Li_2O$ | 5.0 | 1.0 | 3.0 | 3.0 | 3.0 |
| $BaO$ | 3.5 | 8.0 | 3.8 | 4.0 | 1.5 |
| $MoO_3$ | 1.8 | 1.8 | 2.0 | 2.5 | 2.0 |
| $WO_3$ | — | — | — | — | — |
| S.P. | 784 | 815 | 734 | 627 | 733 |
| A.P. | 469 | 534 | 506 | 454 | 502 |
| St.P. | 429 | 499 | 461 | 424 | 457 |
| Exp. | 82.7 | 75.2 | 69.2 | 101.0 | 72.7 |
| D | 2.44 | 2.45 | 2.45 | 2.38 | 2.38 |
| Major Crystal Phase | $BaMoO_4$ | $BaMoO_4$ | $BaMoO_4$ | $BaMoO_4$ | $BaMoO_4$ |
|  | 11 | 12 | 13 | 14 |  |
| $SiO_2$ | 75.8 | 76.6 | 76.6 | 74.9 |  |
| $Al_2O_3$ | 8.6 | 8.7 | 8.7 | 8.5 |  |

TABLE I-Continued

| | | | | |
|---|---|---|---|---|
| Na$_2$O | 7.3 | 8.8 | 8.8 | 7.2 |
| K$_2$O | 1.6 | 1.9 | 1.9 | 1.6 |
| Li$_2$O | 1.0 | 1.0 | 1.0 | 1.0 |
| BaO | 3.9 | — | — | 3.8 |
| MoO$_3$ | 1.8 | — | 3.0 | — |
| WO$_3$ | — | 3.0 | — | 2.9 |
| S.P. | 791 | 841 | 839 | 820 |
| A.P. | 547 | 560 | 555 | 535 |
| St.P. | 511 | 510 | 515 | 495 |
| Exp. | 62.1 | 65.0 | 64.9 | 62.1 |
| D | 2.38 | 2.41 | 2.51 | 2.43 |
| Major Crystal Phase | BaMoO$_4$ | Na$_2$WO$_4$ | Na$_2$MoO$_4$ | BaWO$_4$ |

It is apparent that, with barium oxide present in a glass, there is a tendency for molybdate or tungstate of barium to precipitate and thus form the dominant opacifying crystal phase. However, as illustrated by examples 12 and 13, the sodium crystal phase forms in the absence of barium.

Example 9 illustrates the effect of high total alkali metal oxide content in softening a glass and raising its coefficient of thermal expansion. Also the chemical durability of such a glass would be less than desirable. However, while such a glass would not normally be considered suitable for use alone, it could provide excellent properties for a core glass in a composite such as described in U.S. Pat. No. 3,673,049 granted June 27, 1972 to J. W. Giffen et al. In such construction, chemical durability of the core glass is not critical and a high expansion can be very useful in providing a basis for securing a composite article exhibiting extremely high strength.

Example 3 illustrates the effect of low total alkali metal oxide in hardening, that is increasing the viscosity characteristics of the glasses. Example 7 illustrates the effect of high BaO content on glass softening point, while example 6 illustrates the effect of Li$_2$O in depressing the annealing and strain points.

We claim:

1. An essentially boron-free and fluorine-free spontaneous opal glass consisting essentially, in percent by weight on an oxide basis, of 65–80% SiO$_2$, 2–12% Al$_2$O$_3$, 0.5–5% Li$_2$O, 5–16% R$_2$O, wherein R$_2$O consists of Na$_2$O and/or K$_2$O and wherein at least 5% Na$_2$O is present in the absence of BaO, 1.2–4% RO$_3$, wherein RO$_3$ consists of 1.2–4% MoO$_3$, 1.6–4% WO$_3$, or mixtures thereof at least equivalent to 1.2% MoO$_3$, and 0–10% BaO, the glass having as its predominant opacifying phase a crystal selected from the group consisting of sodium molybdate, sodium tungstate, barium molybdate, barium tungstate, and mixtures thereof.

2. A glass in accordance with claim 1 wherein RO$_3$ consists of 1.2–4% MoO$_3$ and the predominant crystal phase is sodium molybdate or barium molybdate.

3. A glass in accordance with claim 1 wherein RO$_3$ consists of 1.6–4% WO$_3$ and the predominant crystal phase is sodium tungstate or barium tungstate.

4. A glass in accordance with claim 1 wherein the glass contains BaO in an amount effective to precipitate a crystal phase within the glass as it cools from the molten state and the predominant crystal phase is barium molybdate or barium tungstate.

5. A glass in accordance with claim 4 wherein the BaO content is not over 5%.

6. A glass in accordance with claim 1 wherein the glass contains Na$_2$O in an amount effective to precipitate a crystal phase within the glass as it cools from the molten state, and the predominant crystal phase is sodium tungstate or sodium molybdate.

7. A glass in accordance with claim 1 wherein the composition contains 4–10% Na$_2$O, 1–5% K$_2$O and a total of 5–13% Na$_2$O + K$_2$O.

8. A glass in accordance with claim 1 wherein the Li$_2$O content is 1–3%.

9. A glass in accordance with claim 1 wherein the Al$_2$O$_3$ content does not exceed 10%.

10. A tempered glass article having a coefficient of thermal expansion of at least $45 \times 10^{-7}$/°C. and composed of a glass in accordance with claim 1.

* * * * *